United States Patent [19]

Warner

[11] 3,823,416

[45] July 9, 1974

[54] FLYING MAGNETIC TRANSDUCER ASSEMBLY HAVING THREE RAILS

[75] Inventor: Michael Walter Warner, San Jose, Calif.

[73] Assignee: International Business Machines Corporation, Armonk, N.Y.

[22] Filed: Mar. 1, 1973

[21] Appl. No.: 337,032

[52] U.S. Cl. .................................. 360/122, 360/130
[51] Int. Cl. .......................... G11b 5/60, G11b 21/20
[58] Field of Search 179/100.2 P, 100.2 C, 100.2 R; 340/174.1 E, 174.1 F; 346/74 MC

[56] References Cited

UNITED STATES PATENTS

| | | | |
|---|---|---|---|
| 3,480,936 | 11/1969 | Gerlach et al. | 179/100.2 P |
| 3,525,987 | 8/1970 | Muijderman | 340/174.1 E |
| 3,579,214 | 5/1971 | Solyst | 340/174.1 F |

*Primary Examiner*—Alfred H. Eddleman

[57] ABSTRACT

A magnetic head assembly is disclosed for transducing information upon a relatively moving magnetic recording surface while flying thereover and that starts and stops in contact with the recording surface. The assembly comprises a magnetic slider body including three downwardly depending longitudinal rails that are laterally spaced apart, the bottom surfaces of the two outside rails forming an air bearing surface, and a magnetic core longitudinally aligned with the center rail so as to define a transducing gap. The transducing gap is located at the roll axis of the assembly such that the air bearing developed during relative movement maintains the gap at a substantially constant distance from the recording surface even during rolling motion of the assembly.

11 Claims, 10 Drawing Figures

FLYING MAGNETIC TRANSDUCER ASSEMBLY HAVING THREE RAILS

BACKGROUND OF THE INVENTION

1. Field of the Invention

This invention relates to flying magnetic transducer assemblies, and more particularly to such transducer assemblies that start and stop in contact with a magnetic medium and that have three longitudinal rails with the magnetic core aligned with the center rail.

2. Description of Prior Art

Magnetic recording systems utilizing transducers that fly on an air bearing film over a magnetic recording disk surface are well known in the art. Decreasing the spacing between the transducer gap and the medium enhances system performance. Transducers have been developed which fly 50 microinches above a rotating disk surface. These transducers are mounted in a slider assembly which in turn is suspended by pressure biased leaf springs. Loading forces on the order of 300 to 400 grams have been required to create an air bearing with sufficient stiffness to cause the transducer to fly at a relatively constant distance from the recording medium during dynamic operation. Problems are encountered where there are irregularities of only a few microinches in the disk surface. Because of these irregularities the flying height of the transducer is caused to vary. These flying height variations sometimes cause the transducer to contact the disk surface. Such contact, or head crashes of this high mass, heavily loaded transducer could cause damage to the transducer or the disk suface, requiring machine shutdown to repair or replace the damaged component and/or cause loss of information stored on the disk. Similar problems would be encountered if the speed of disk rotation decreased below the minimum necessary to provide the required air bearing film. In order to prevent this damage, expensive head unloading mechanisms are required to remove the transducer assembly from just above the magnetic disk surface whenever it is desired to stop the disk from rotating or to change storage media.

Recording transducers directed to the concept of utilizing a magnetic slider body for generating an air bearing for non-contact recording are available as evidenced by U.S. Pat. No. 3,579,214 to Solyst which issued May 18, 1971. This patent describes a multichannel magnetic transducer assembly in which the magnetic slider body completes the magnetic circuit for each transducing element. However, this apparatus requires loading forces in excess of 1,200 grams to maintain the transducers at their specified flying heights and is not applicable in systems which require the transducer to access the desired track. Moreover, this transducer is relatively expensive to manufacture in view of the precise machining required to accurately form the several core legs at equal distances from one another in order to insure that all tracks written on the magnetic recording medium are equally spaced apart.

A prior art magnetic transducer having a traditional two surface taper-flat air bearing surface is shown in a side elevation view in FIG. 5*a*. The air bearing developed longitudinally under the traditional slider body is illustrated by the pressure profile curve in FIG. 5*b*, which is seen to have a single peak. It can be seen that the pressure increases from atmospheric pressure at the leading edge and rapidly builds up as air is squeezed under the taper portion. Beginning at the taper-flat boundary and over the flat portion, the pressure continues to increase to a maximum just before the trailing edge is reached. At the trailing edge the pressure abruptly decreases to atmospheric. This slider has no longitudinal bleed slots and does not permit side air flow within a defined region under the slider body. Since there are no regions of reduced pressure under the slider body and since the air bearing surface is the entire area under the slider body, large loading forces are required to maintain the transducer assembly at a desired flying height, similar to the transducer described above.

Prior art transducing assemblies also teach a construction that includes a plurality of downwardly depending pads. For example, one apparatus includes a tripad construction that contacts the magnetic medium at three spaced apart points. However, this transducer assembly is intended for contact recording and thus is inapplicable for flying. Another transducer assembly includes a slider that comprises three large outer pads and a multiplicity of transducers mounted in the center of the slider. This assembly is too heavily loaded to operate in start/stop in contact and has too much inertia to always maintain the transducing gap at a fixed distance from the recording medium, when the slider is subjected to a rolling or pitching motion while accessing. Still other assemblies include a slider having a groove extending laterally across its air bearing surface which undesirably picks up contaminants from the disk surface, particularly in start/stop operation.

In order to overcome the above-noted defects, a novel magnetic transducer assembly has been invented wherein the air bearing developed during relative movement between the assembly and the recording surface maintains the gap at a substantially constant distance from the recording surface even during rolling motion of the assembly. The assembly comprises a magnetic slider body and a magnetic core integrally bonded thereto. The body includes three downwardly depending longitudinal rails that are laterally spaced apart, the bottom surfaces of the two outside rails forming substantially the entire air bearing surface. The magnetic core is longitudinally aligned with the center rail so as to define a transducing gap, the gap being located at the roll axis of the assembly.

Another feature of this invention is to provide a magnetic transducer assembly as set forth above wherein the core is C-shaped and bonded to the trailing surface of the magnetic slider body, the core and the body providing a path for the magnetic flux associated with the transducing gap.

Yet another feature is to provide a magnetic transducer assembly as set forth above wherein the three rails are beveled, have a taper-flat profile, are rectangular in plan view with a length to width ratio of at least five and preferably ten, and wherein the outside rails are located at the outer extremities of the slider body and provide substantially the entire effective air bearing surface.

Another feature of the invention is to provide a magnetic transducer assembly as set forth above wherein the associated pressure profile developed longitudinally along the air bearing surface of the outside rails comprises a double peak, the first peak occurring rearwardly of the taper-flat boundary and the second peak occurring at substantially the trailing surface, and wherein the slider body is symmetrical in shape around a central axis.

Accordingly, it is an object of this invention to provide a small, lightweight, rugged, magnetic recording transducer that is capable of starting and stopping in contact with a magnetic recording surface without damaging the transducer or the disk surface, that is not subject to picking up contaminants while flying less than 25 microinches from the disk surface, and which is simple and inexpensive to manufacture, and capable of being batch fabricated.

The foregoing and other objects, features and advantages of the invention will be apparent from the following more particular description of the preferred embodiment of the invention and as illustrated in the accompanying drawings.

DESCRIPTION OF THE INVENTION

Figure 1:
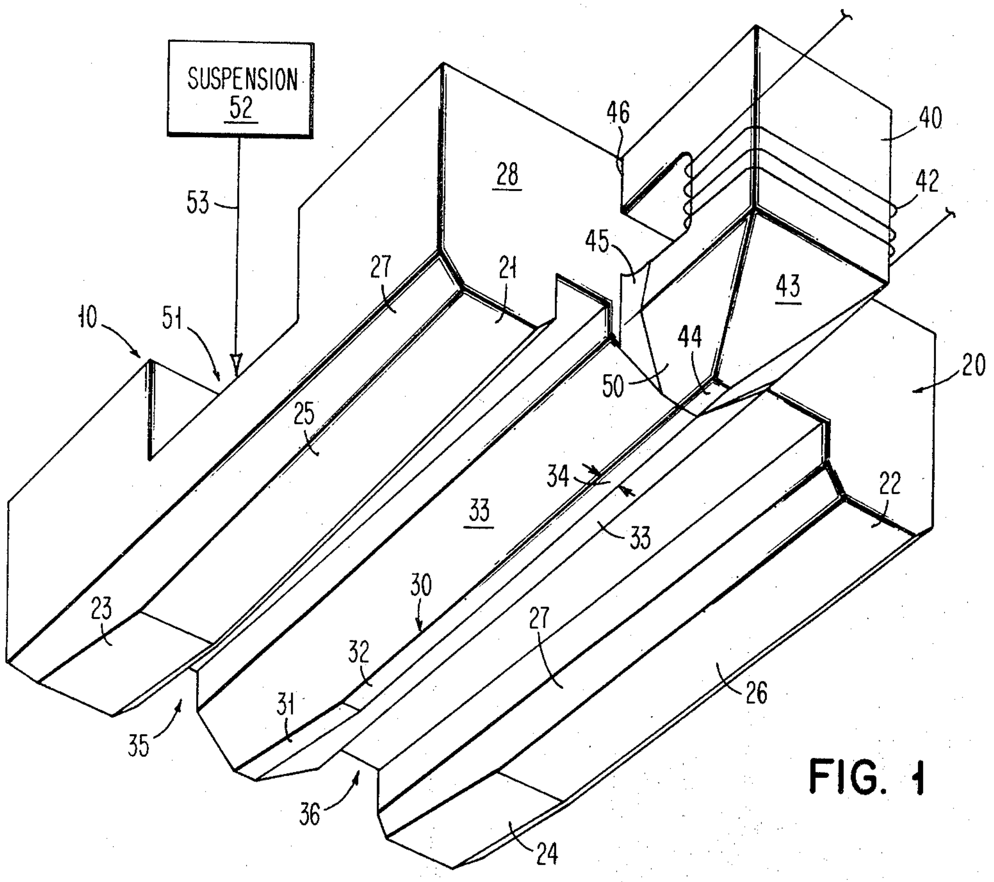
FIG. 1 is an orthogonal view of the preferred embodiment of the magnetic transducer assembly of this invention.
Figure 2:
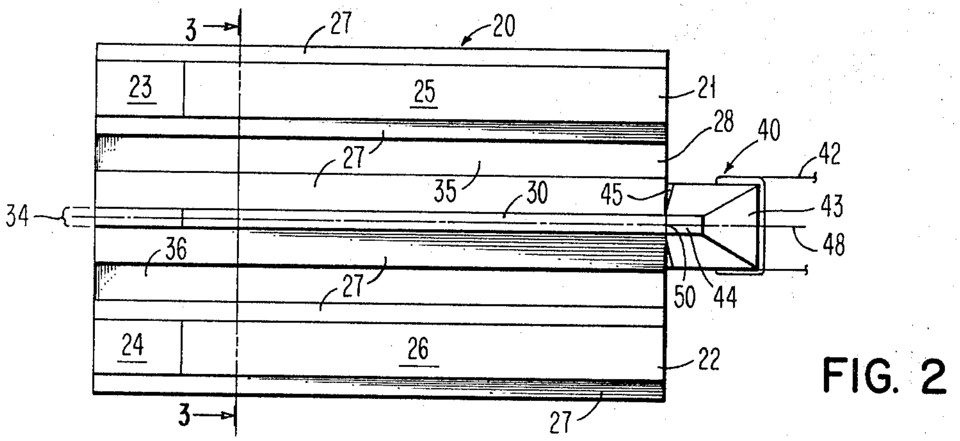
FIG. 2 is a plan view of the air bearing surface of the transducer of FIG. 1.

The magnetic transducer assembly shown in FIGS. 1, 2 and 6, and generally designated by the numeral 10, comprises a magnetic slider body 20 and a magnetic core 40 having a coil 42 wound therearound, that are integrally bonded to one another with an adhesive 45, which is preferably glass, so as to form the transducing gap 50. The magnetic transducer assembly 10 is attached to a suspension system illustrated diagrammatically as 52 for maintaining the assembly in position on or above the associated magnetic disk surface 15. The transducer assembly is loaded toward the disk surface by a load means illustrated diagrammatically as 53 and associated with the suspension system 52.

The unitary magnetic slider body 20 is preferably formed from a ferrite material and includes three downwardly depending longitudinal rails 21, 22 and 30 that are parallel to and coplanar with one another. Each rail has a taper-flat profile with the respective flat portions 25, 26 and 32 occurring in back of the leading edge taper portions 23, 24 and 31, respectively. The outside rails 21 and 22 are located at the outer extremities of the slider body and are wider than the width 34 of the center rail 30 so as to provide substantially the entire air bearing surface. The three rails are separated by bleed slots 35 and 36 which provide paths for undesired air to bleed off from the air bearing outside rail surfaces during flying operations without contributing to the effective air bearing surface of the slider or changing the flying height 16.

The edges formed between the lateral and air bearing surfaces of the three rails are beveled as shown by the respective inclined surfaces 27 and 33. The bevel edge is strong enough to prevent chipping during start/stop operation. The beveling is utilized to accurately control the read/write track width, e.g., center rail width, and also the area of the air bearing surface. Because of the parallel rail configuration, all the rails may be machined by a step and repeat machining operation sequence.

The magnetic core 40 is formed into a C-shape from a magnetic ferrite material, generally the same ferrite material as is used to form the slider body 20. The core is glass bonded to the trailing face 28 of the slider body 20 in longitudinal alignment with the center rail 30. The upper leg portion that defines the back gap 46 is greater in cross section area than the tapered lower leg portion that forms the transducing gap. The larger back gap area provides a lower reluctance than does the smaller transducing gap area, and consequently improves head efficiency. Portion 44 of the core 40 is coplanar with and a protective continuation of the center rail 30. This portion protects the read/write gap 50 from wear during head/disk contact. Rearwardly of the protective portion 44, the core surface 43 is steeply inclined away from the gap, to prevent the core from contributing to the air bearing and to prevent contaminants from collecting near the transducing gap. The bonding glass lies solely in the transducing gap region. Accordingly, the formation of contaminating particles caused by glass erosion or wear during start/stop in contact operation of the transducer assembly are minimized.

The transducer assembly is symmetrical in shape and mass about a plane 49 passing through the center of rail 30 and core 40 whereby the transducing gap 50 is located at the roll axis 48 of the transducer assembly.

The suspension system 52 which carries the magnetic head assembly is attached to the notch 51 in the top portion of the slider body 20. The other end of the suspension is anchored to an accessing arm. The suspension is preferably formed from a thin piece of stainless steel and provides stiffness in a plane parallel to the recording media which is the plane of accessing and friction forces. The suspension system 52 includes a load beam 53 which loads the slider within the notched region at its center of gravity and close to the air bearing surface. However, load points forward of or behind the center of gravity have been found to develop a pressure profile that provides acceptable flying characteristics.

Referring now to FIG. 2, the air bearing surface of the transducer is illustrated. The outside rails are rectangular in plan view with an overall length to width ratio of 10 but at least 5, and are at least five times as wide as the center rail so as to provide substantially the entire effective air bearing surface.

Figures 3A, 3B, 4A, 4B, 5A, 5B, 6A, 6B:
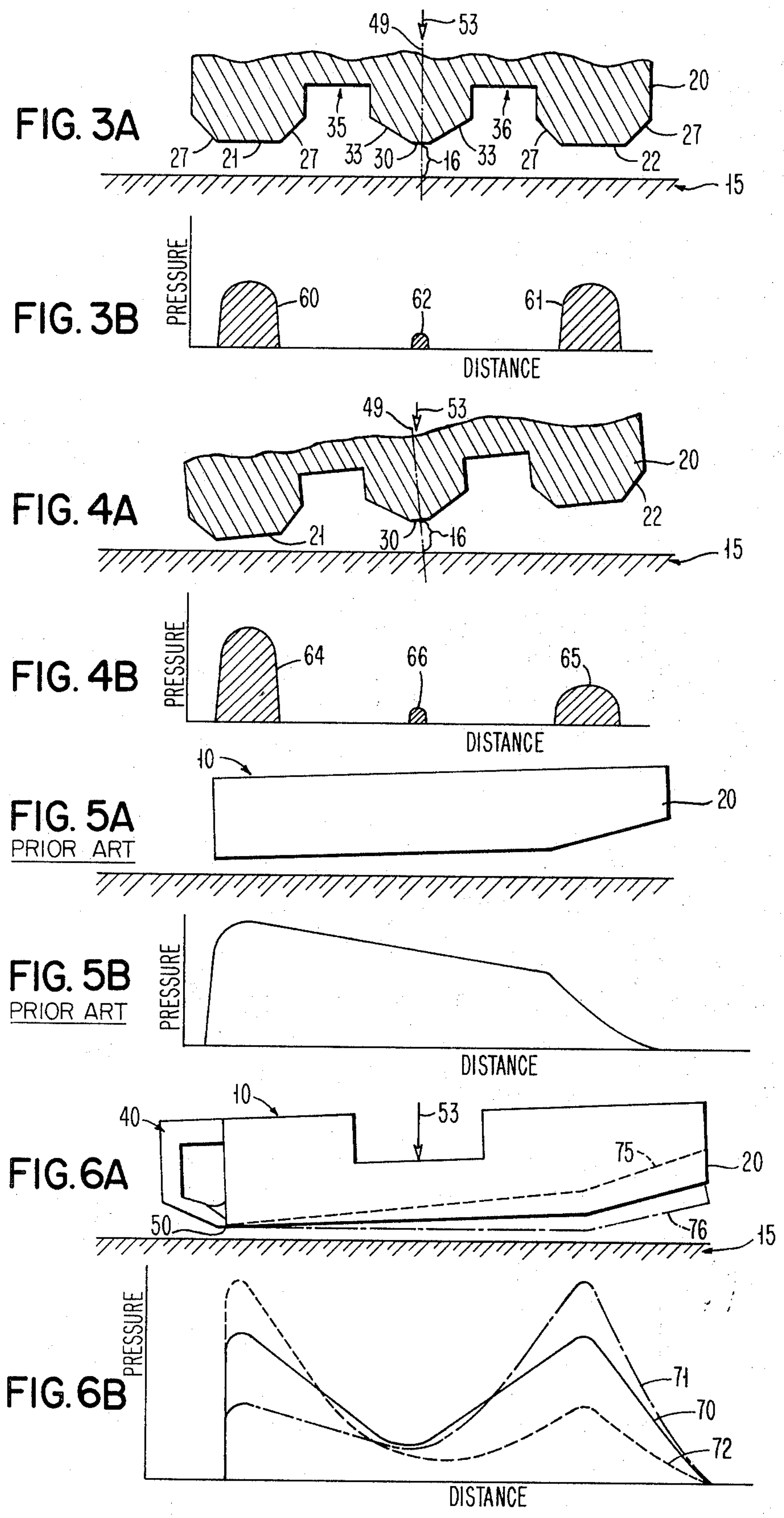
FIG. 3A, FIG. 3B, FIG. 4A, FIG. 4B, FIG. 5A PRIOR ART, FIG. 5B PRIOR ART, FIG. 6A, FIG. 6B
FIG. 3*a* is an elevation sectional view taken through the lines 3—3 of FIG. 2.
FIG. 3*b* is a graph depicting the pressure profile taken across the width of the transducer assembly of FIG. 3*a*.
FIGS. 4*a* and 4*b* depict the section view and pressure profile, respectively, of the transducer of this invention, that is displaced about its roll axis from equilibrium.
FIG. 5*a* is a side elevational view of a prior art magnetic transducer having the traditional taper-flat air bearing surface.
FIG. 5*b* is a graph depicting the pressure profile taken along the length of the transducer assembly of FIG. 5*a*.
FIGS. 6*a* and 6*b* are similar to FIGS. 5*a* and 5*b* as related to the magnetic transducer assembly of this invention, and depicts the assembly at equilibrium and displaced about its pitch axis.

Referring now to FIG. 3*a*, the laterally symmetrical transducer is shown in an equilibrium flying position with the three rails all being equidistant from the rotating disk surface 15. FIG. 3*b* illustrates the pressure profile taken across the width of the transducer assembly of FIG. 3*a* of the pressure generated under the air bearing surface. The pressure is shown to be equal under the outside rails 21 and 22 as illustrated by the curves 60 and 61, respectively. Curve 62 illustrates the pressure under the center rail 30, and is much smaller in magnitude than the pressure under the outside rails. There is negligible pressure under the bleed slots.

As illustrated in FIG. 4, rotation of the transducer assembly in the roll direction about axis 48 causes rail 21 to become closer to the disk surface. Such rotation could be caused by an irregularity in or by a contamination on the disk surface. In this condition the pressure developed under rail 21 as depicted by curve 64 increases and, correspondingly, the pressure 65 developed under rail 22 decreases due to the change in flying height between these rails and the disk surface. Under this condition the transducer assembly is not in equilibrium. The higher pressure 64 will tend to force rail 21 away from the disk surface and the load force 53 will cause rail 22 to become closer to the disk surface until equilibrium is again achieved. For all rotational positions the pressure 62 or 66 under the center rail is the same. Accordingly, it is apparent that since the transducing gap 50 is located at the roll axis 48 of the transducer assembly, the gap 50 will be maintained at a constant flying height under such conditions which cause the transducer to roll about its center axis.

Referring now to FIGS. 6*a* and 6*b*, the transducer is shown in side view in an equilibrium flying position above the rotating disk surface 15. Curve 70 of FIG. 6*b* illustrates the pressure profile taken along the length of the transducer assembly under one of the air bearing rails when load 53 is applied and the slider is in equilibrium. The pressure profile curve is shown to exhibit two substantially equal peaks having a lower pressure region therebetween. Curve 72 depicts the pressure when the slider is pitched up as illustrated diagrammatically by the dashed air bearing surface outline 75 in FIG. 6*a* and curve 71 depicts the pressure when the slider is pitched down as illustrated by the shorter-dashed line 76.

As illustrated in FIG. 6, pitching of the transducer assembly causes the transducer to pivot about an axis substantially through the transducing gap, whereby the leading edge of the slider moves up or down relative to the disk surface, and thus out of equilibrium. Such rotation could be caused by an irregularity in or by a contamination on the disk surface. If the slider pitches up as illustrated by condition 75, the pressure developed under the rails as depicted by curve 72 is such that it will push on the back end of the slider and tip it forward to the equilibrium condition again. Similarly, if the slider is pitched down as in 76, the higher pressure at the nose of the slider as illustrated by curve 71 will tend to force the leading edge away from the disk and into equilibrium again. For all pitching positions, since the pivoting is approximately about the transducing gap axis, the dynamic flying height will remain substantially constant.

The following description of the operation of this novel transducer will describe how the illustrated pressure profile is developed.

The system which employs the magnetic transducer of this invention is one in which the transducer starts and stops in contact with the disk surface. In operation, prior to rotating the disk the magnetic transducer is in contact with the disk surface in a landed condition. As the disk begins to rotate the front taper of the slider causes a pressure buildup to a first peak at the taper-flat boundary, thus causing the leading edge of the low mass transducer to rapidly and smoothly lift from the disk surface. The pressure then gradually decreases under the leading portion of the long narrow flat rails and, due to the lifting of the transducer off the disk some of the trapped air initially bleeds off the rail portion into the adjacent bleed grooves. This lower pressure region reduces the lift effect in the region near the center of the rail length. However, rearwardly of the center region as the rail to media spacing decreases, the squeeze effect of the trapped air overtakes the bleed effect and the pressure increases to create a second peak proximate to but just before the trailing face 28. The pressure drops to atmospheric once again at the trailing face 28 of the slider body. Accordingly, a continuous longitudinal pressure profile is developed which comprises two peaks having a lower pressure region therebetween.

Once the disk is rotating at rated speed and the transducer is flying over the disk surface, the pressure acting on the transducer is the cumulative pressure acting on its air bearing surface. The cumulative air bearing pressure profile under the slider of this invention is arrived at by superimposing the pressure profile curves across the width of the slider as shown in FIG. 3*b* and along the length of the slider as shown in FIG. 6*b*. The resultant pressure profile exhibits four concentrated peak portions, one at each corner under the slider, surrounded by relatively low pressure regions. This pressure thus supports the slider under its outside rails like four legs supporting a table.

It should be remembered that the amount of load required to maintain a transducer at a constant flying height is proportional to the product of the average pressure applied to the air bearing surface and the area of the air bearing surface. The bleed grooves do not contribute to the area of the air bearing surface. Hence, substantially the entire load is determined by the four concentrated spaced-apart pressure peaks and the corresponding relatively small surface areas thereunder. Because of lateral symmetry the load is distributed equally to each of the outside rails.

It will be appreciated that since the transducer starts and stops in contact with the disk, head loading or unloading systems are not required, and only a change of speed of the record surface is necessary to automatically cause the head to fly or to land. As the speed of the disk decreases, the pressure likewise decreases, thus causing the transducer to move closer to the disk surface until it gradually lands. In landing, the trailing portion and then the flat portion of the transducer gradually contact the disk surface. Since the leading edge is tapered the transducer does not dig into the disk surface.

Accordingly, there has been described a magnetic transducer assembly with three longitudinal rails that are laterally spaced apart which requires only a low loading force to constantly maintain a flying height of only several microinches and which exhibits improved pitch and roll stability. The outside rail length to width ratio of 10 allows enough air to bleed off, before the squeeze effect is initiated so as to achieve the unique double peak pressure profile curve. Because the rails are continuous in the direction of transducer motion and have no depressions therein, contaminants are unable to collect on the underside of the slider.

In the preferred embodiment the length of the body is 0.25 inches, the total body width is 0.150 inches, the outside rails are 0.025 inches wide and the center rail is 0.005 inches wide. The mass of the head assembly is 0.25 grams and a load of less than 20 grams is applied at the center of gravity. Alternative embodiments employ center rail track widths of between 1 and 20 mils.

While there has been described what is, at present, considered to be the preferred embodiment of the invention, it will be understood that various modifications may be made therein, and it is intended to cover in the appended claims all such modifications that fall within the true spirit and scope of the invention.

I claim:

1. A magnetic transducer assembly for transducing information upon a magnetic recording surface during relative movement between the transducer assembly and the recording surface, said assembly comprising:

a magnetic slider body including three downwardly depending longitudinal rails having bottom surfaces that are laterally spaced apart, the bottom surfaces of at least the two outside rails forming an air bearing surface, and a magnetic core longitudinally aligned with the center rail and at the trailing edge of said assembly, said core including a transducing gap portion that is substantially coplanar with the bottom surface of the center rail.

2. The magnetic transducer assembly set forth in claim 1, wherein said rails are beveled.

3. The magnetic transducer assembly set forth in claim 1, wherein said core proximate to said transducing gap has the same width as said center rail and extends rearwardly of said slider body, whereby said core does not contribute to said air bearing surface.

4. The magnetic transducer assembly set forth in claim 1, wherein the trailing edge of said core is inclined away from said coplanar portion.

5. The magnetic transducer assembly set forth in claim 1, wherein the bottom surfaces of said outside rails and said center rail and said core are coplanar.

6. The magnetic transducer assembly set forth in claim 1, wherein said core is substantially uniform in width and tapers to form a more narrow transducing gap, the greater width in the back gap region contributing to an increase in transducer efficiency.

7. The magnetic transducer assembly set forth in claim 1, wherein said gap is located along the centerline of said center rail and at the roll axis and the pitch axis of said assembly, such that the air bearing developed during relative movement between said assembly and said recording surface maintains said gap at a substantially constant distance from said recording surface even during rolling and pitching motion of said assembly.

8. The magnetic transducer assembly set forth in claim 7, said slider body being symmetrical around the roll axis and wherein said outside rails are at the outer extremities of said slider body.

9. The magnetic transducer assembly set forth in claim 1, wherein said three rails have a taper-flat profile, said outside rails providing substantially the entire effective air bearing surface.

10. The magnetic transducer assembly set forth in claim 9, wherein said air bearing surfaces of said rails are rectangular and have a length to width ratio of at least five.

11. The magnetic transducer assembly set forth in claim 9, wherein the associated pressure profile developed longitudinally along said air bearing surface comprises a double peak, the first peak occurring rearwardly of the taper-flat boundary and the second peak occurring at substantially the trailing surface.

* * * * *